Nov. 18, 1941.    L. S. LEWIS    2,263,441
HIDE-GATHERING MACHINERY
Filed Sept. 30, 1939    6 Sheets-Sheet 1

WITNESS:

INVENTOR
Leicester S. Lewis
BY
Augustus B. Stoughton
ATTORNEY.

Nov. 18, 1941.  L. S. LEWIS  2,263,441
HIDE-GATHERING MACHINERY
Filed Sept. 30, 1939  6 Sheets-Sheet 2

WITNESS:

INVENTOR
Leicester S. Lewis
BY
Augustus B. Stoughton
ATTORNEY.

Nov. 18, 1941.　　　　L. S. LEWIS　　　　2,263,441
HIDE-GATHERING MACHINERY
Filed Sept. 30, 1939　　　6 Sheets-Sheet 3

WITNESS:

INVENTOR
Leicester S. Lewis
BY
Augustus B. Stoughton
ATTORNEY.

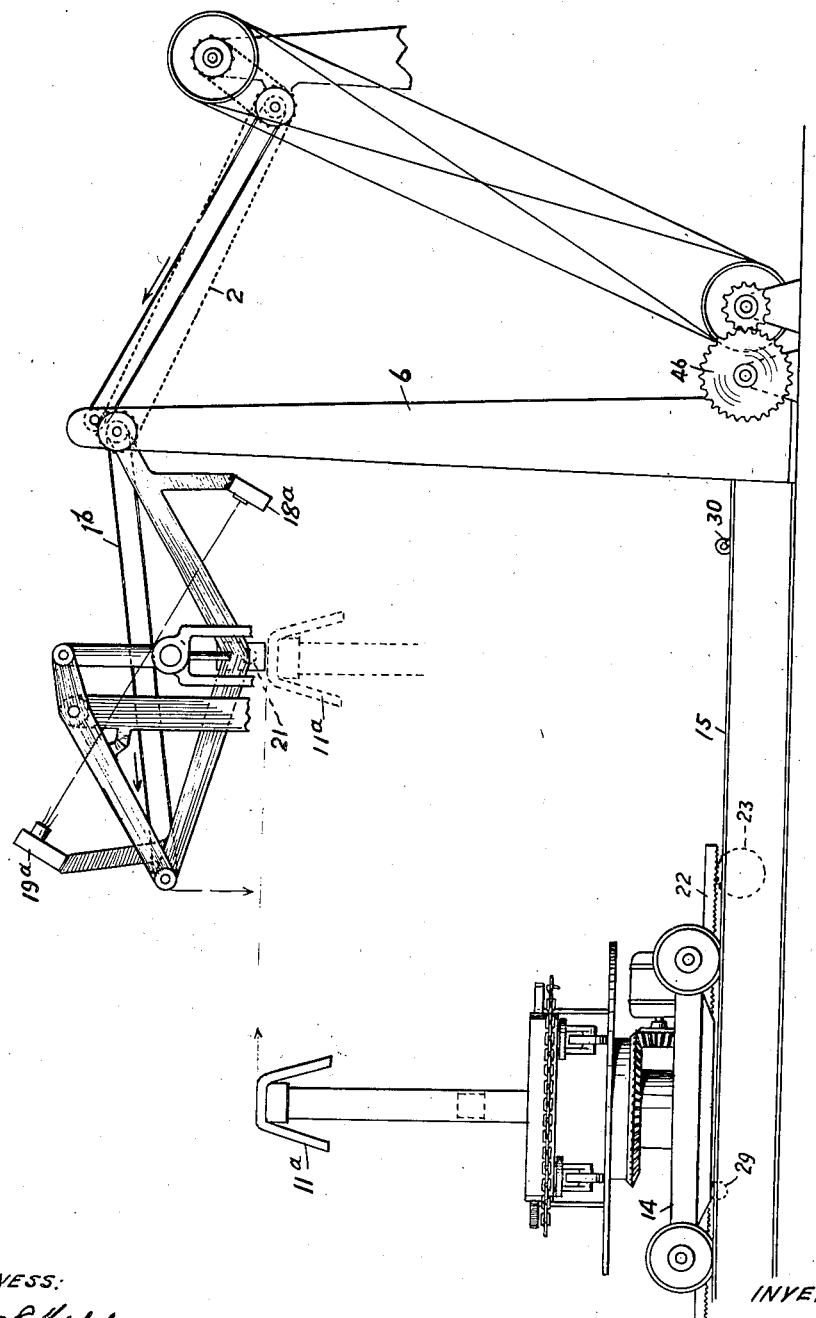

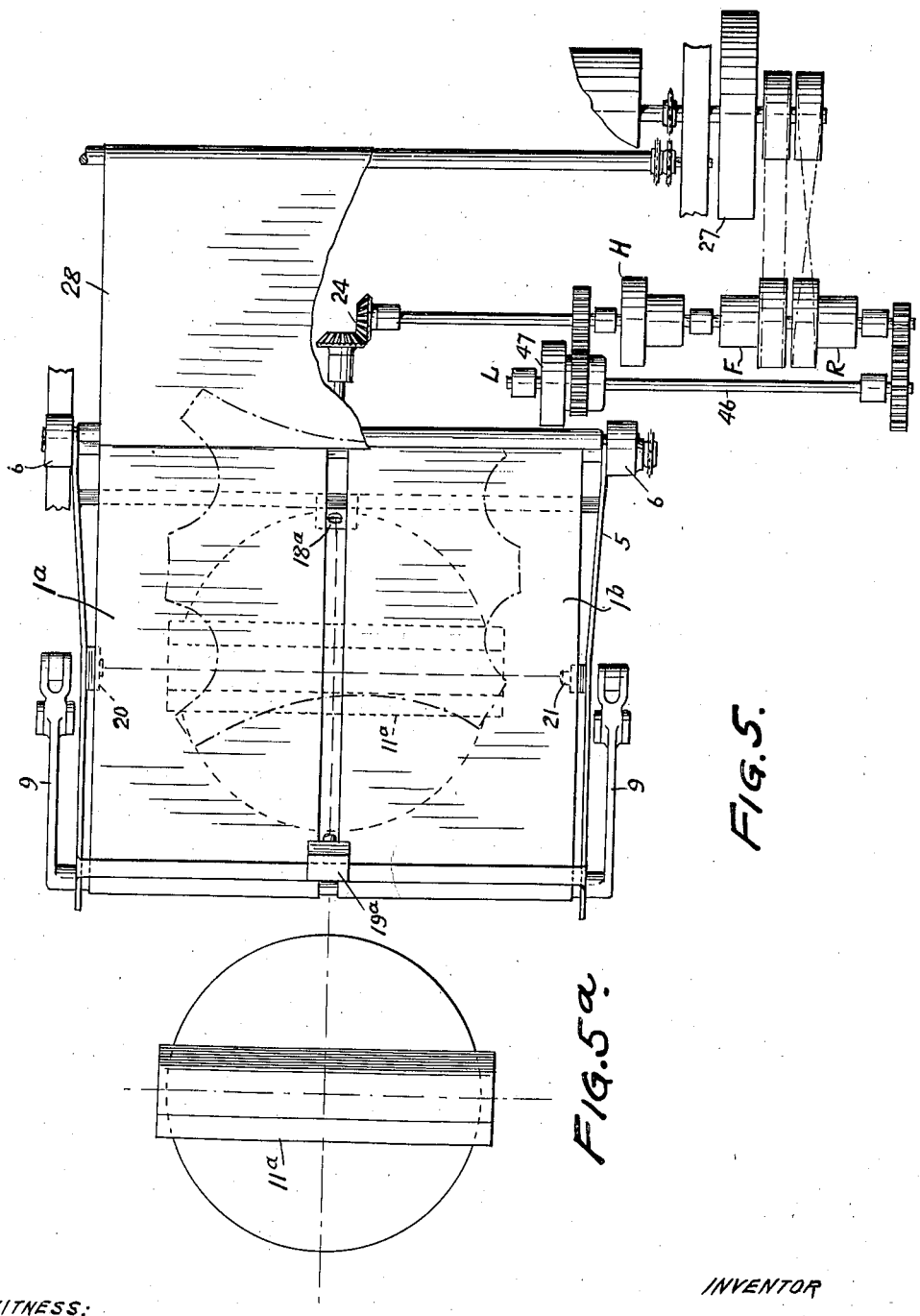

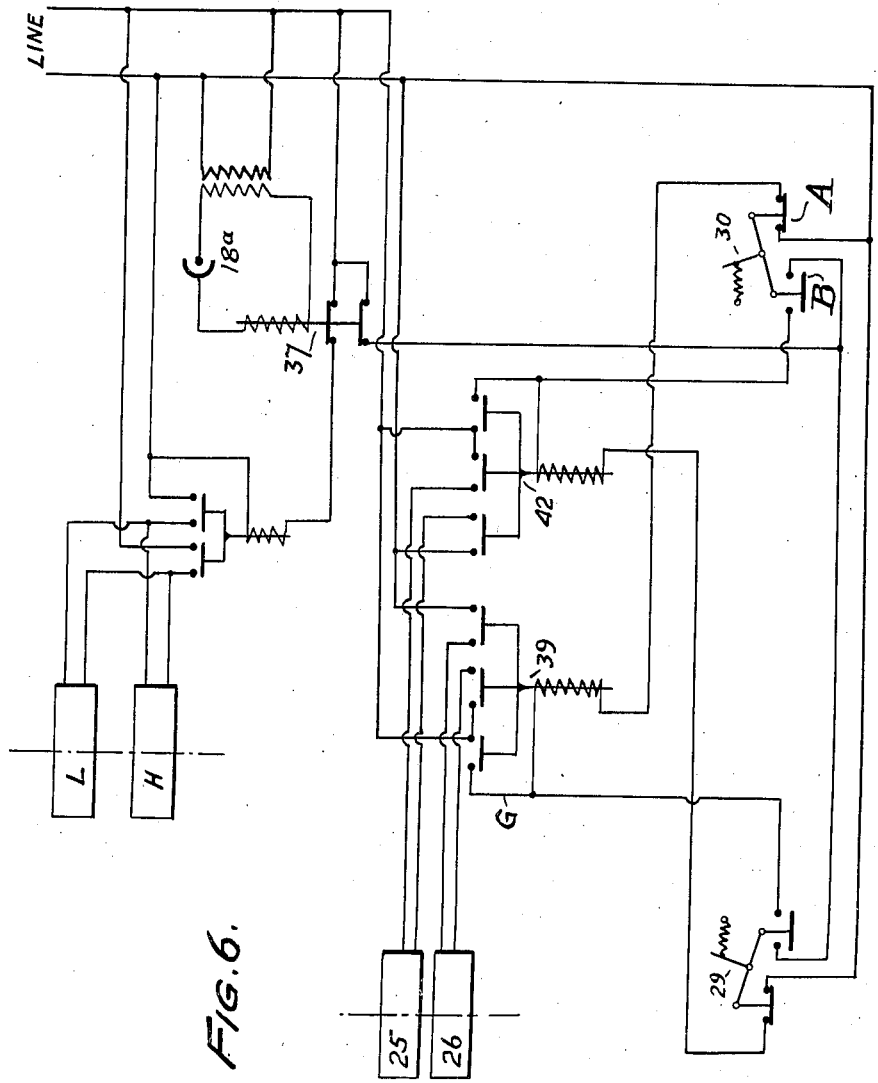

Patented Nov. 18, 1941

2,263,441

UNITED STATES PATENT OFFICE 2,263,441

HIDE-GATHERING MACHINERY

Leicester S. Lewis, Bryn Mawr, Pa., assignor to Tabor Manufacturing Company, Philadelphia, Pa., a corporation of Pennsylvania Application September 30, 1939, Serial No. 297,255

7 Claims. (Cl. 271—84)

The principal object of the present invention is to provide simple, reliable and efficient machinery for use in the tanning and leather industries and which is adapted to perform operations which at this time, so far as I know, are performed manually, and which operations involve gathering hides from machines of various kinds now employed in the industry and stacking the hides, whether delivered head or tail first or sidewise, with the faces of like name, i. e., hair side or flesh side, in contact with each other or with the faces of unlike name, i. e., hair and flesh side in contact with each other, and with the heads and tails of all the hides lying in the same direction; briefly, the hides are stacked one upon another in the same relation in which they are delivered or in different relation or in any usually desired relation.

Another object of the invention is to so construct and arrange the parts of the hide-gathering machine that its operation shall be automatic.

Other objects of the invention will appear from the following description at the end of which the invention will be claimed.

Generally stated, the invention comprises: feed mechanism delivering hides flatwise and one after another and downwards, a support movable crosswise of the path of the hide descent and constructed and arranged to receive the hides, and means for moving the support at substantially the same linear speed or at one-half linear speed as the travel of the hides with or without means for giving the support a half turn.

The invention also comprises the improvements to be presently described and finally claimed.

In the following description, reference will be made to the accompanying drawings forming part hereof and in which.

It may be remarked that, in the industry to which this invention relates, hides undergo various treatments and are delivered from those treatments flatwise and one after another always in the same relation; that is, with the same part first and the same side or surface up. The hides so delivered are manually piled or stacked on suitable supports or horses. It is sometimes desirable to collect the hides on the horse or support with sides of like name in contact with each other, i. e., the flesh sides in contact with each other, and this particular arrangement has to do with the operations that are performed on the hides. Sometimes hides are gathered on the horses hair side to flesh side, or otherwise stated with the sides of opposite name in contact with each other. Hides have two sides or faces. The side or face which is next to the animal is frequently called the flesh side, and the side or face which is furthermost away from and constitutes the outside of the animal is frequently called the hair or grain face or side. Sometimes it is desirable that the hides should be stacked with the heads and tails in the same direction. All this involves manual labor and expense. By way of further explanation, but not limitation, it may be said that, in the manufacture of leather, the hair or grain sides of the hides may be greased by passing the hides through a machine, not the subject of this application, and they are delivered from that machine greased side up. At present, laborers receive these hides and stack them manually on a horse but the laborers in doing so have to turn every other of the hides over to bring the hides greased side to greased side. The machine of this invention about to be described does the work formerly done by these laborers so that the expense of the laborers is avoided. For the sake of clearness, it may be said that the hides, on leaving the greasing machine, are transferred to the machine of the present invention by means of a conveyor.

The machine about to be described is constructed and arranged to perform all of the things above recited and others in an automatic manner.

Figure 1:
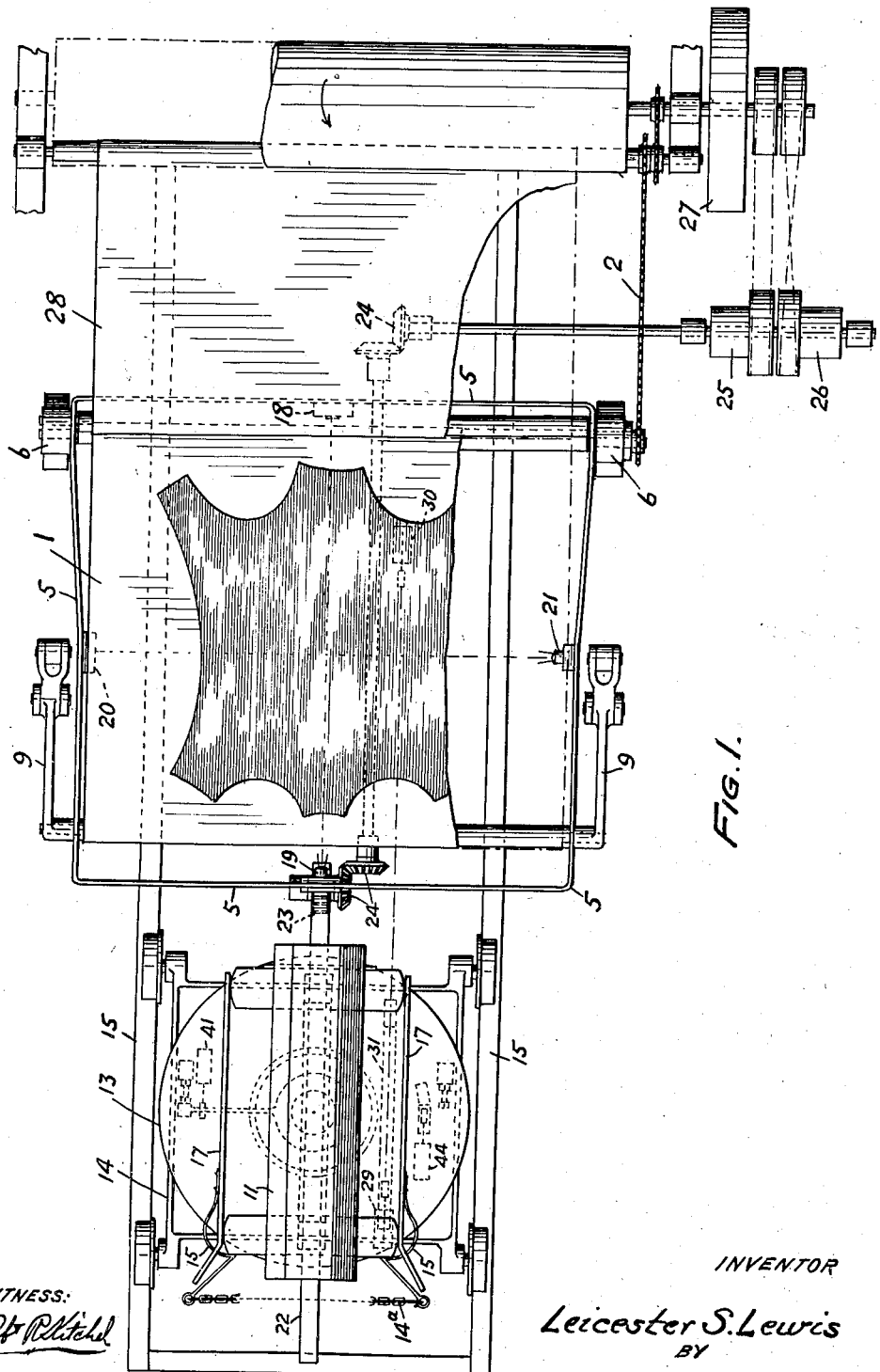
Fig. 1 is a top or plan view of a machine embodying features of the invention and adapted to gather hides delivered head or tail first.
Figure 2:
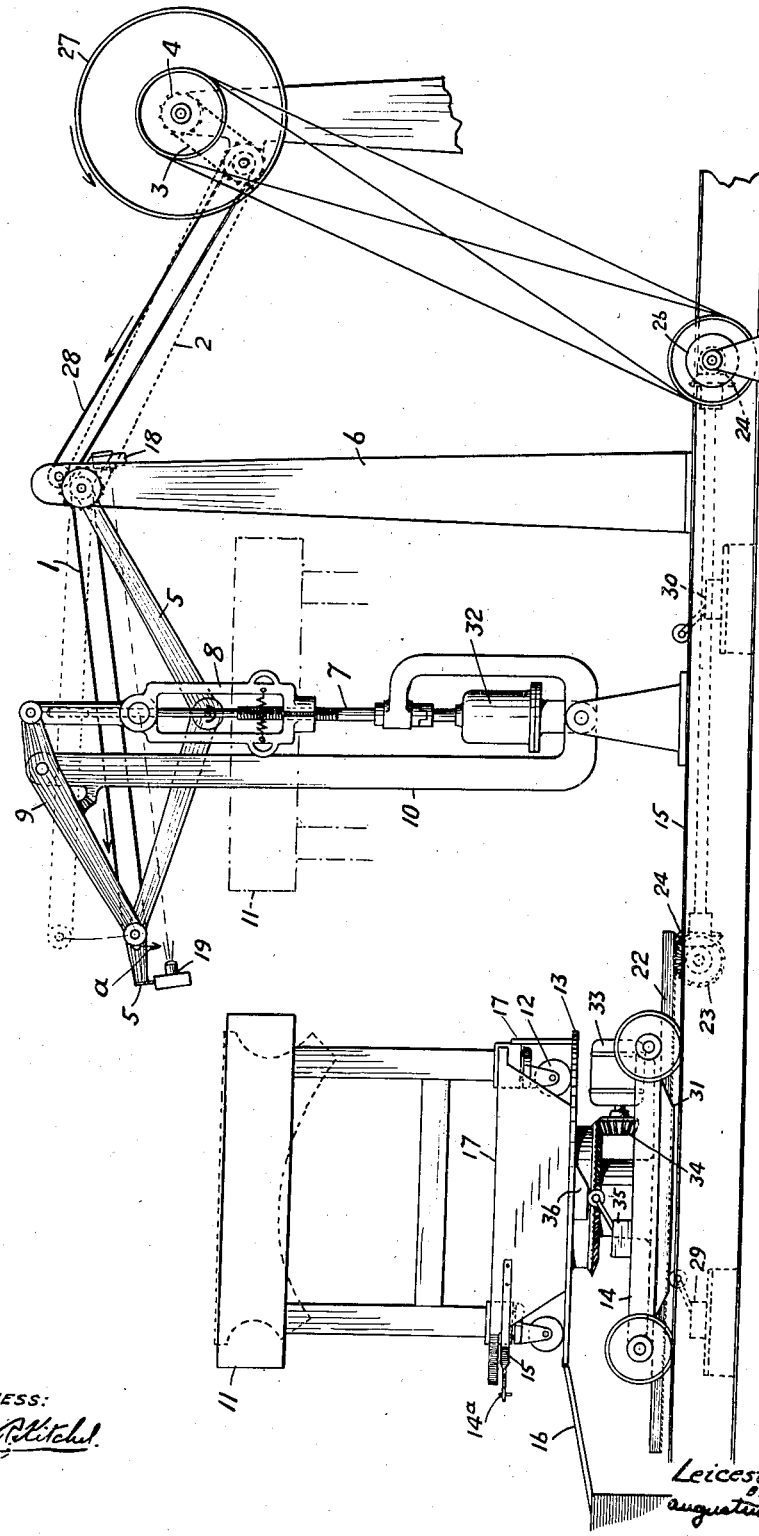
Fig. 2 is a side elevation of the machine shown in Fig. 1.
Figure 3:
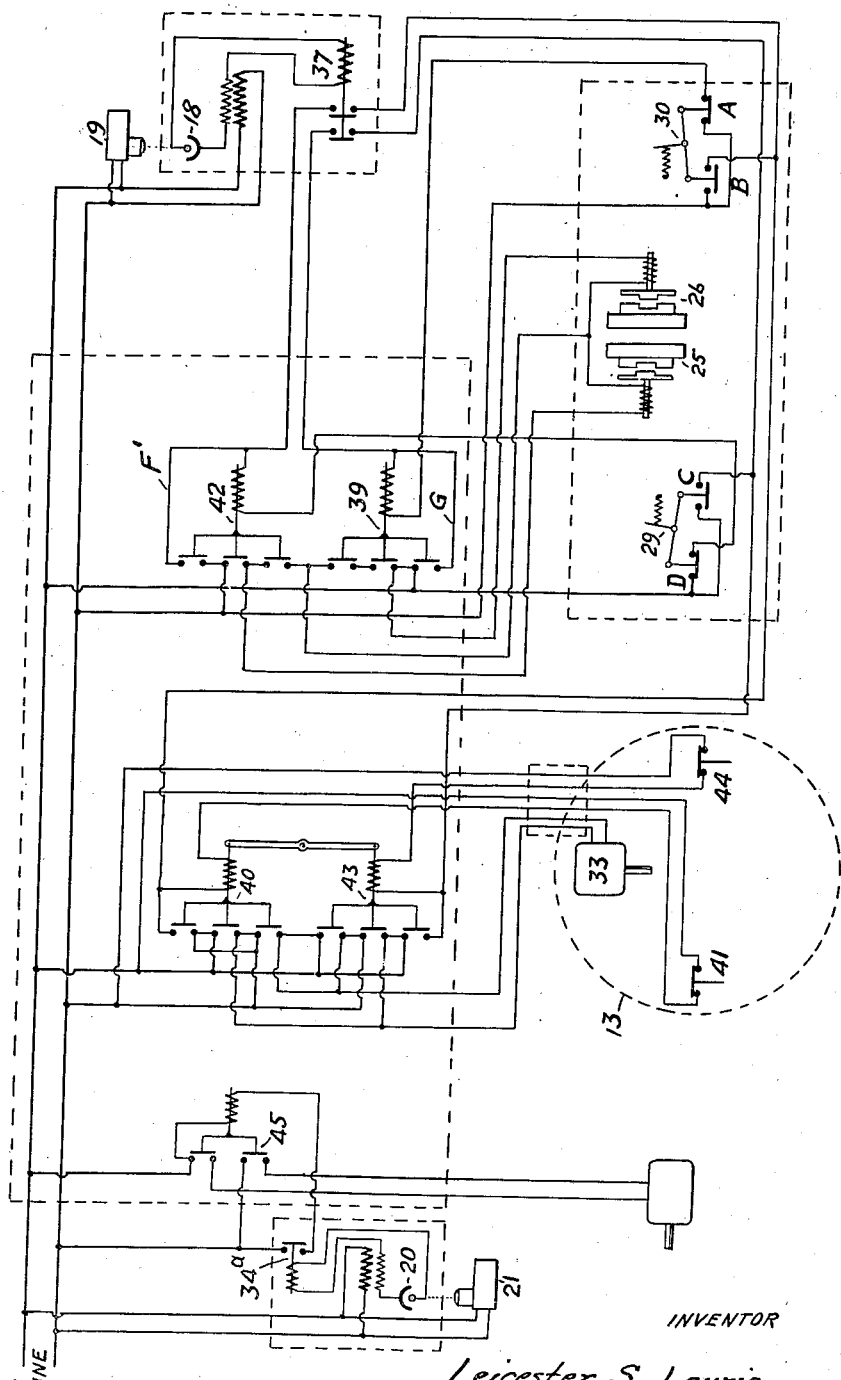
Fig. 3 is a diagram illustrating circuits and electrical connections for controlling the movements of the machine shown in Fig. 1, and Figs. 4, 5, 5a and 6 are similar views illustrating a modification in which the hides are delivered edgewise, flank first.

Referring to the drawings and more particularly to Figs. 1 to 3, at the right there is shown feed mechanism delivering hides flat wise and one after another and downward. This mechanism is shown to comprise a continuously driven conveyor belt 1. To the belt 1 the hides are delivered by feeding mechanism or the like not forming part of the present invention from some previous machine or operation which usually delivers the hides with the same or like faces up. This conveyor belt is driven by the gearing 2, 3, 4 from any convenient source of power. The free end of the conveyor belt is carried by a frame 5 pivoted to the standards 6. The free end of the conveyor 1 is raised and lowered by a screw 7 and two-part nut 8. The two-part nut 8 is connected with one end of a lever 9 pivoted intermediate of its ends to a standard 10 (fixed except for slight turning movement) and, at its other end, to the element that carries the roller at the free end of the belt or conveyor 1. Hides are delivered one after another and flatwise, and usually with the sides of the same name up, onto the conveyor 1 during the travel of which the hides leave the end of the conveyor 1 in downward direction. At the left in Fig. 1 of the drawings there is indicated a turnably mounted support 11 movable in two directions: from left to right; and right to left in Fig. 2, crosswise of the path of hide descent from the end of the conveyor 1, which is indicated by the arrow *a* in Fig. 2. This support is constructed and arranged to receive hides with the sides of the same name in contact and with the ends of the same name (head or tail) disposed in correspondence. As shown, this support comprises a horse 11 mounted on car wheels 12, and a turntable 13 mounted on a wheeled truck 14 adapted to travel back and forth on ways or rails 15.

The movement and function of the parts referred to will be first described and then there will be described means for automatically controlling their operation.

Assuming that hides lying flatwise and hair side up are to be delivered head first from the free or left-hand end of the conveyor, the support travels from the position indicated by dotted lines in Fig. 2 to the position indicated by full lines at the left in Fig. 2 and gathers the hide with the head toward the left and the hair side up. Then the support 11 with the first hide on it is given a half turn and proceeds toward the right and during that travel another or second hide is delivered to it in a similar manner. The half turn of the support causes the head of the first hide to face the right. Then the support moves toward the right and picks up a second hide with the head also facing toward the right and with the hair side down in contact with the hair side of the first hide so that a second hide is delivered to the support 11 during its travel from the full to the dotted line position in Fig. 2. Obviously these operations may be repeated until the desired number of hides has been gathered on the horse 11. On the turntable are mounted two upright, parallel, spaced guards 17 between which the base of the horse is arranged. On the guards 17 are spring-catches 15 of knuckle-shape tending to engage and hold the base of the horse. The chain 14*a*, of which the center portion is not shown for the sake of clearness of illustration, connects the two catches and holds them up to engagement with the base of the horse. By removing the chain 14*a* (Fig. 1) and releasing the spring-catches 15, the horse can be wheeled down the incline 16. The purpose of the chain 14*a* and the guard 17 is to prevent the horse accidentally leaving the turntable.

Evidently the truck 14 must move in co-ordination with the delivery of a hide. As shown in Figs. 1 to 3, this is accomplished by a photoelectric cell 18 carried by the element 5 and the light source 19 carried by the free end of the swinging frame 5. These parts are so arranged that a hide descending at *a* cuts off the light and energizes circuits which will be hereinafter described. It is quite evident that as hides accumulate on the support, the free end of the conveyor must be raised. This is accomplished by another photo-electric cell 20 and its light source 21 (Fig. 1) from which the light is obscured by a pile of hides on the support and which operate to set the screw 7 in motion and elevate the free end of the conveyor 1 by circuits which will be described. The split-nut 8 affords a means for manually lowering the free end of the conveyor 1. The carriage or truck 14 carries a rack 22 which meshes with a gear 23. Through suitable gearing 24, the gear 23 is driven in one direction as one or the other of magnetic clutches 25 or 26 is in engagement and the clutches are driven through belts shown in dotted lines and of which one is crossed from the power shaft which drives the delivery mechanism 27, 28 which belongs to the machine with which the invention is used and which is an ordinary provision of a hide or leather plant. 29 and 30 are reversing switches operated by a cam 31 on the car or truck 14 and their function is to reverse the direction of travel of the car. 32 is a motor for turning the screw 7 and 33 is a motor for actuating the gear 34 which turns the turntable. The switch 35 and cam 36 control the circuit of the motor 33.

While the circuits and connections are capable of considerable variation and are not specifically claimed in this application, they may be described as follows.

Photo-electric cells 18 and 20 are equipped with normally closed relays 37 and 34*a*, respectively, which they hold open when light beams from their respective light sources 19 and 21 reach them due to their circuits being connected to the line.

Assume turntable carriage 14 to be in the center of its travel and traveling toward the right with magnetic clutch 26 engaged and clutch 25 disengaged. These clutches are normally disengaged and are engaged only when the circuit through them is completed.

Upon reaching the right-hand end of its travel, the carriage 14 strikes limit switch 30 and opens contact A, releasing the solenoid of starter 39 and disengaging clutch 26, stopping the movement of the carriage to the right. At the same time, contact B is made, allowing current to flow from line, through starter 40 and through normally closed limit switch 41 and back to the other side of line, closing starter 40 and causing motor 33 to rotate turntable 13 one-half revolution in clockwise direction until stop or cam 36 on turntable turns its follower downwards and this motion of the follower opens switch 41 in housing 35, disconnecting 40 and stopping rotation of turntable by motor 33.

Carriage and turntable remain stationary until a skin coming off conveyor intercepts light beam emitted by light source 19 and falling upon photo-electric cell 18, permitting open relay 37 to assume its normally closed position and allowing current to flow from line through B and through 37, thence through solenoid coil of starter 42 and through normally closed contact D of limit switch 29 to line.

This closes starter 42, engaging clutch 25, starting carriage traveling toward left-hand end of the base. When starter closes, running circuit F is completed and switch 30 and relay 37 are short-circuited; the movement of the carriage allows limit switch 30 to return to its normal position as shown.

Upon reaching the left-hand end of its travel, the carriage strikes limit switch 29 and breaks contact D, releasing starter 42 and disengaging clutch 25, stopping the motion of the carriage. At the same time contact C is made, allowing current to flow from line, through solenoid of starter 43 and through limit switch 44 back to line, closing starter 43 and causing motor 33 to rotate turntable 13 in counterclockwise direction until stop on turntable strikes limit switch 44, disconnecting starter 43 and stopping rotation of turntable.

Carriage and turntable remain stationary at left end of track until skin coming off conveyor interrupts light beam to photo-electric cell 18, again closing relay 37 and making a circuit from line through contact C, through relay 37, through solenoid of starter 39 and through contact A of limit switch 30 and back to the line.

This closes starter 34 and engages clutch 26, starting carriage traveling toward the right-hand end of its travel. When starter closes, running circuit G is completed and switch 29 and relay 37 are short-circuited. The movement of the carriage allows limit switch 29 to return to its normal position as shown. This comprises one cycle of operation of the turntable mechanism.

The motor 33 is an electrically reversible motor which is reversed by use of starters 43 and 40, which comprise a reversing starter mechanism. Limit switches 41 and 44 are normally closed, as shown, and limit switches 29 and 30 have one normally closed and one normally open contact with automatic return to normal position. Magnetic clutches 25 and 26 are normally disengaged, as shown, and are controlled by starters 42 and 39, respectively.

The motor 32 is the motor for elevating the end of the conveyor 1 from the machine, and is controlled by means of photo-electric cell 20, which, when a pile of skins on turntable 13 below conveyor becomes high enough to intercept the light beam from light source 21, causes relay 34a to close and operate starter 45, elevating conveyor until light beam is allowed to pass over skins again, at which time relay 34a is again opened and starter 45 disconnected and elevating motor stops. This circuit is independent of the turntable and traversing circuits.

The construction and operation of the modification indicated in Figs. 4, 5 and 6 are as above described except as follows. In this modification, many of the parts are identical or substantially so and they are indicated by the same reference letters. In this modification the skins are delivered flank edge first with their heads all pointing in the same direction but they are gathered with their like sides or faces in contact; that is, hair side to hair side; and flesh side to flesh side. In this modification the horse or support 11a is arranged crosswise of the conveyor. The conveyor is made in two parts 1a and 1b for a purpose that will be described. The drive for the conveyor in this modification includes not only the open and the closed or crossed belts but also a speed-change gear or mechanism 46 put into and out of action by a magnetic clutch 47. H indicates the high speed provisions and L indicates the low speed provisions. The light source 19a and its photo-electric cell 18a are arranged in such position that the light rays, generally speaking, bisect the conveyor belts and traverses the space between them.

In operation the construction and arrangement is such that when a hide is traveling on the conveyor 1b with its flank first, it proceeds at a uniform speed but its leading edge intercepts the light beam with the result that the carriage and support proceed toward the left at half speed. The carriage and support continues at half speed underneath the hide until the light beam from, 19a to 18a, is re-established, which causes the carriage and support to then move at full speed, which is substantially that of the conveyor. The support having thus been located under the middle part of the hide, all hides will be gathered evenly on the support as they come off the conveyor, with their back-bone portions in the center.

The circuit for controlling the various parts is somewhat modified; for example, as shown in Fig. 6. When the carriage 14 and horse 11a are in the position shown in dotted lines under the conveyor, the limit switch 30 under the machine is held down, reversing the normal position of the contacts A, B. A skin coming along the conveyor 1a, 1b breaks the light beam falling upon the photo-electric cell 18a and causes starter 39, 42 to disengage high-speed clutch H and to engage low-speed clutch L. At the same time the electric eye makes contact through the limit switch 30 under the conveyor and causes starter to engage the clutch F for forward motion. The carriage moves toward the left-hand end of the base at half speed of the conveyor until the light beam to photo-electric cell is re-established, due to the skin having passed by, causing the starter to engage the high-speed clutch, and permitting the low-speed clutch to become disengaged. The carriage then continues at the same speed as the conveyor until it reaches the left-hand end of the base and strikes the limit switch 29 there, stopping its motion.

The return trip of the carriage and horse is the same as the above, with the exception that the carriage travels toward the right, and the clutch R, for reverse motion, is used instead of the clutch F.

It may be remarked that if the hides are of substantially the same thickness the end of the conveyor 1 may be elevated by the rotation of the screw 7 and in that case the light source 21 and eye 20 may be omitted and the motor 32 run at constant speed. Again if the hides are fed to the conveyor at regular intervals the movement of the machine parts can be timed without the employment of the light source 19 and the eye 18.

It will be obvious to those skilled in the art to which the invention relates that modifications may be made in details of construction and arrangement and in matters of mere form without departing from the spirit of the invention which is not limited in respect to such matters or otherwise than as the prior art and the appended claims may require.

I claim:

1. Means for gathering hides comprising in combination, feed mechanism delivering hides flatwise and one after another so that part of each hide hangs in space, a horse-like support movable crosswise of the path of hide descent and constructed and arranged to contact with the pendent portion of the hide and to receive the hides in over-hanging positions, and means for moving the support at substantially the linear speed of the travel of the hides and simultaneously with the descent of each hide and for contacting a hide when substantially one-half of the hide is pendent.

2. Means for gathering hides comprising in combination, feed mechanism delivering hides flatwise and one after another and downward into pendent position, a horse-like support movable crosswise of the path of hide descent and constructed and arranged to contact with and receive substantially the middle portions of the hides and to accumulate the hides in overhanging position, said feed mechanism and support being relatively adjustable in vertical direction to accommodate an accumulation of hides, devices for relatively adjusting the feed mechanism and support in consonance with the accumulation of hides, and means for moving the support simultaneously with the descent of each hide.

3. Means for gathering hides comprising in combination, feed mechanism delivering hides flatwise and downward and one after another with the faces or sides and ends of the same name in the same relative positions, a turnably mounted support movable in two directions crosswise of the path of hide descent and constructed and arranged to receive hides with the sides or faces of the same name in contact and with the ends of the same name disposed in correspondence, means moving the support at substantially the same linear speed as the travel of the hides and simultaneously with the descent of each hide, and means moving the support a half turn between the reception of the oncoming hides.

4. Means for gathering hides comprising in combination, feed mechanism delivering hides flatwise and downward into pendent position in space and one after another with the sides or faces of the same name in the same relative positions and with the flank edges in leading positions, a support movable crosswise of the path of hide descent and operated to contact with the pendent portions of the hides and to receive the same, and means for moving the support at substantially the same linear speed as the travel of the hides, and at substantially half that speed to allow half the hide to drop into space before it is picked up by the support, thereby aligning the back-bone portion of the hide.

5. Means for gathering hides comprising in combination, a tiltably mounted feed conveyor delivering hides flatwise and one after another downward from its free end, a wheeled turntable, a track extending under and past the delivery end of the feed conveyor and on which the wheeled turntable travels back and forth crosswise of the path of hide descent, a wheeled support frame removably mounted on the turntable and constructed and arranged to receive and accumulate hides, mechanism for driving the wheeled turntable and including a rack and pinion, limit stop switches and magnetically operated reversing clutches reciprocating the wheeled turntable on the track with a dwell at the end of its outward movement, motor driven turning means including stopping and starting switches giving the turntable a half turn during the dwell in its movement, motor driven nut and screw means lifting and lowering the free end of the conveyor to accommodate it to an accumulation of hides on the support frame, a photo-electric cell and light source disposed across the path of hide travel and having circuit connections operating the magnetic clutches, and a second photo-electric cell and light source mounted on the free end of the conveyor and disposed above the support frame and in the line of travel of the wheeled turntable and provided with circuit connections operating the motor of the nut and screw means.

6. Means for gathering hides comprising in combination, a tiltably mounted feed conveyor delivering hides flatwise and one after another downward from its end, a wheeled support frame, a track extending under and past the delivery end of the feed conveyor and on which the wheeled supporting frame travels back and forth crosswise of the path of the hide descent, mechanism driving the wheeled frame and including rack and pinion means and limit stop switches and magnetically operated reversing clutches reciprocating the wheeled supporting frame on the track, motor driven nut and screw means lifting and lowering the free end of the conveyor to accommodate it to an accumulation of hides on the supporting frame, a photo-electric cell and its light source disposed across the path of hide travel and having current connections operating the magnetic clutches, and a second photo-electric cell and light source mounted on the free end of the conveyor and disposed above the supporting frame and in the line of travel of the supporting frame and provided with circuit connections operating the motor of the nut and screw means.

7. In means for gathering hides the combination of, a two-part conveyor traveling at constant speed and having its parts spaced apart, a supporting frame mounted for reciprocation under the end of the conveyor, means reciprocating the supporting frame at the same speed as the conveyor and at half that speed, a photo-electric cell and a light source of which the beam traverses the space between the conveyors in the line of an oncoming hide, and circuit connections and means responsive to the photo-electric cell and changing the speed of travel of the supporting frame.

LEICESTER S. LEWIS.